United States Patent [19]

Wostal

[11] Patent Number: 4,538,791
[45] Date of Patent: Sep. 3, 1985

[54] VALVE MECHANISM FOR A LIVESTOCK WATERING BOWL

[75] Inventor: Terry K. Wostal, Baraboo, Wis.

[73] Assignee: Norse Leasing Corp., Phoenix, Ariz.

[21] Appl. No.: 598,536

[22] Filed: Apr. 10, 1984

[51] Int. Cl.³ .............................................. A01K 39/02
[52] U.S. Cl. ................... 251/339; 119/72.5; 119/75
[58] Field of Search ................ 119/72.5, 75; 251/339

[56] References Cited

U.S. PATENT DOCUMENTS

| | | | |
|---|---|---|---|
| 444,911 | 1/1891 | Yont | 119/75 |
| 1,162,286 | 11/1915 | Ferris | 119/75 |
| 1,337,636 | 4/1920 | Bogda | 119/75 |
| 2,469,946 | 5/1949 | Bremer | 119/75 |
| 2,874,996 | 2/1959 | Zajac | 251/339 |
| 3,144,853 | 8/1964 | Blough | 119/75 |
| 3,646,955 | 3/1972 | Olde | 137/382 |
| 3,786,785 | 1/1974 | Olde | 119/75 |
| 4,014,365 | 3/1977 | Peterson et al. | 251/339 |
| 4,476,812 | 10/1984 | Dube et al. | 119/75 |

FOREIGN PATENT DOCUMENTS

| | | |
|---|---|---|
| 2498418 | 7/1982 | France ............... 119/75 |
| 587919 | 5/1947 | United Kingdom . |
| 611670 | 11/1948 | United Kingdom . |
| 853105 | 11/1960 | United Kingdom . |
| 941901 | 11/1963 | United Kingdom . |

Primary Examiner—A. Michael Chambers
Attorney, Agent, or Firm—Andrus, Sceales, Starke & Sawall

[57] ABSTRACT

A valve mechanism for a livestock watering bowl. The valve mechanism is mounted in a water inlet line in the bowl and is adapted to be actuated by an animal to control the flow of water into the bowl. The valve mechanism includes a body provided with an inlet connected to the water line and having a central chamber connected through an inlet passage to the inlet. The inlet is adapted to be opened and closed by a valve member carried by a plunger that extends axially through the inlet passage and the central chamber and terminates in a button that projects outwardly from the opposite end of the body. The portion of the plunger located within the inlet passage has a non-circular cross section to provide a clearance between that portion of the plunger and the inlet passage, while the portion of the plunger located within the central chamber is formed with a laterally extending shoulder. When the button is pushed by an animal, the valve member will be moved to the open position enabling water to flow through the inlet passage to the central chamber where it is deflected and reduced in velocity by the shoulder and is discharged to the outlet. The valve mechanism provides a substantial volume of water flow without splashing or overflowing of water in the bowl.

9 Claims, 4 Drawing Figures

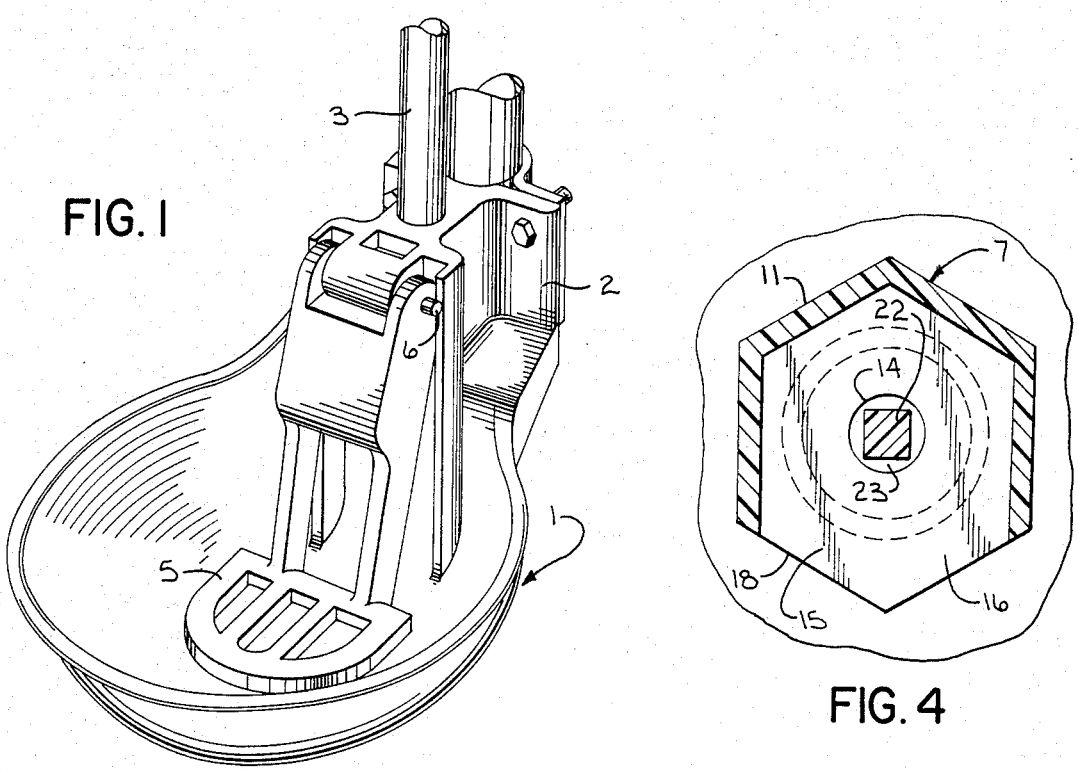
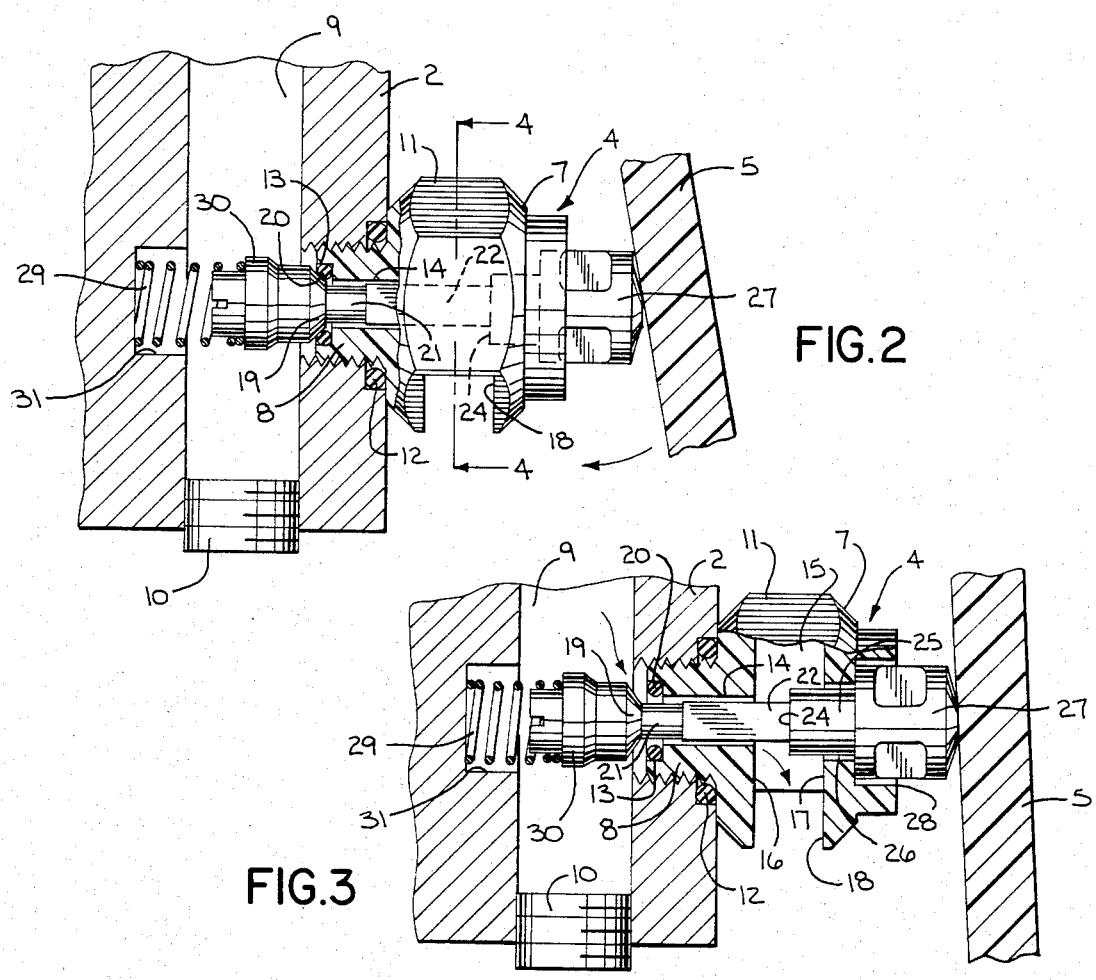

VALVE MECHANISM FOR A LIVESTOCK WATERING BOWL

BACKGROUND OF THE INVENTION

Livestock watering bowls normally include a valve mechanism that is adapted to be actuated by an animal to deliver water from a water pipe to the watering bowl. The conventional valve mechanism includes a button or plunger which is located above the level of the bowl and can be actuated directly by the animal, or in other cases, the button is actuated by pivotal movement of a nose plate that is pivoted to the bowl. In either case the pressing of the button acts to open the valve to deliver water to the bowl.

As the water in the water line is normally under substantial pressure, the water being discharged into the bowl tends to splash and overflow. The splashing or overflowing water can mix with the bedding, feed, or manure in the barn, causing a messy condition. To eliminate the splashing problem, attempts have been made in the past to reduce the velocity of the water being discharged to the bowl. For example, valve mechanisms have been employed in which the water is discharged to the bowl through a narrow slit or small orifice. While the use of a slit or orifice reduces the volume of water being discharged to the bowl it also substantially increases the time required to fill the bowl. As a further disadvantage, a narrow slit or small orifice will tend to plug up with sand particles, rust particles, or the like, so that a filter or screen is normally required to be positioned upstream of the slit or orifice. The use of a screen, in turn, requires frequent cleaning and maintenance to prevent clogging.

Attempts have also been made in the past to prevent splashing by introducing the water into the lower portion of the bowl beneath the normal water level. However, this type of construction is against code requirements in the United States as there may be a tendency for the contaminated water in the bowl to be siphoned back into the water line.

SUMMARY OF THE INVENTION

The invention is directed to an improved valve mechanism for a livestock watering bowl which enables high volumes of water to be delivered to the bowl without splashing. In accordance with the invention, the valve mechanism, which is mounted in the water line, includes a body having a water inlet, and the body also includes a central chamber that is connected to the inlet through an inlet passage. A radially extending outlet communicates with the central chamber.

The inlet is adapted to be opened and closed by a valve member carried by a plunger that extends axially through the inlet passage and through the central chamber and terminates in a rounded button that projects outwardly from the opposite end of the body. The valve is biased to a closed position and can be opened by an animal pressing against the projecting button, or alternately, by the animal pivoting a nose plate engaged with the button.

The portion of the plunger located within the inlet passage has a non-circular outer configuration to provide a clearance between that portion of the plunger and the interior of the inlet passage. In practice, the overall cross-sectional area of the clearance is equivalent in size to a one-quarter inch diameter hole.

Located on the central portion of the plunger within the central chamber is a laterally extending shoulder and when the valve is opened, the water flows through the clearance in the inlet passage and strikes the laterally extending shoulder where it is deflected outwardly within the central chamber, thereby substantially reducing the velocity of the water. The water is then discharged downwardly from the central chamber through the discharge outlet to the bowl.

The valve construction of the invention enables substantially greater volumes of water to be discharged into the bowl without splashing or overflowing.

As a further advantage, the clearance between the plunger and the inlet passage is of substantial cross sectional area, far greater in cross sectional area than the conventional orifice or slit, and as such, sand particles, rust fragments and the like, can pass through the clearance without clogging. This not only minimizes clogging of the valve mechanism, but also eliminates the requirement for a screen or filter as used in many conventional valve constructions.

The valve construction of the invention can be used with or without a nose plate or paddle without any change or modification in construction.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of a livestock watering bowl utilizing the valve construction of the invention;

FIG. 2 is a vertical section showing the valve construction with the valve being in the closed positon;

FIG. 3 is a view similar to FIG. 2 showing the valve in the open position; and

FIG. 4 is a section taken along line 4—4 of FIG. 2.

DESCRIPTION OF THE PREFERRED EMBODIMENT

FIG. 1 shows a livestock watering bowl 1 having a base portion 2 that is adapted to be mounted on a stanchion or other fixed support. Water is introduced to the bowl through a water inlet pipe 3 and a valve mechanism 4 controls the flow of water from pipe 3 to bowl 1 and is operated by pivotal movement of a nose plate 5 that is pivoted to bowl 1 by pin 6.

As best shown in FIGS. 2 and 3, valve mechanism 4 includes a body 7 having an inlet nipple 8 which is threaded within an opening in bowl 1 and communicates with water passage 9 that is connected to water inlet pipe 3. The lower end of passage 9 can be closed off by a threaded plug 10.

To facilitate threading of the nipple 8 within the opening in the body, the outer surface of body 7 is provided is a hexagonal configuration, indicated by 11, to receive a suitable wrench.

The joint between the body and the bowl 1 is sealed by a conventional O-ring seal 12.

As shown in FIG. 2, the end of nipple 8 defines a valve seat 13 and an inlet passage 14 extends inwardly from valve seat 13 and connects with a central chamber 15 which is defined by a pair of spaced parallel walls 16 and 17 that are disposed generally perpendicular to the axis of the valve. A radially extending discharge outlet 18 communicates with the central chamber 15 and water being discharged through the valve mechanism 4 is delivered through outlet 18 into bowl 1.

A valve 19 seats against an O-ring 20 on valve seat 13 to close the inlet passage. Plunger 21 is threaded to valve 19 and the plunger extends axially through inlet passage 14 and central chamber 15.

The portion of plunger 21 located adjacent valve 19 has a generally circular configuration and is spaced from the walls of the inlet passage 14, while the central portion 22 of the plunger, as shown in FIG. 4, has a square or non-circular cross section which is spaced from the inner cylindrical wall of inlet passage 14 to provide a clearance 23 through which the water flows.

As shown in FIG. 3, section 22 of plunger 21 terminates in a laterally extending shoulder 24 which extends generally normal to the axis of plunger 21. When the valve is in the closed position, the shoulder will be located within chamber 15 adjacent wall 17 and when the valve is in the open position, as shown in FIG. 3, shoulder 24 will be positioned approximately midway between walls 16 and 17.

End section 25 of plunger 21, located outwardly of shoulder 24, has a generally circular configuration and extends loosely through an opening 26 in body 7. The outer end of section 25 terminates in an enlarged button 27 having an outer rounded surface. Button 27 is disposed within a recess 28 in body 7 when the valve is in the open position, as illustrated in FIG. 3.

In practice, the outer surface of section 25 is spaced from the walls defining opening 26 to permit the passage of small grains of sand, rust fragments and other foreign materials.

Valve 19 is biased to the closed position by a spring 29. One end of spring 29 bears against an annular spring seat 30 formed on the outer surface of valve 19, while the opposite end of spring 29 is seated within a recess 31 formed in body 7. The force of spring 29 urges the valve 19 to the closed position.

In operation, valve 19 is normally maintained in the closed position through the biasing effect of spring 29. When the button 27 is depressed, either directly by the animal's nose, or by the animal pivoting the nose plate 5, plunger 21 carrying valve 19 will be moved inwardly to thereby open valve 19 against the force of spring 29. With the valve open, water will then flow within the clearance 23 between the square section 22 of plunger 21 and inlet passage 14 into the central chamber 15, where it will be deflected outwardly by striking the shoulder 24. This action reduces the velocity and dissipates the energy of the incoming water, so that the water can be discharged downwardly through outlet 18 into bowl 1 without splashing or overflowing.

In addition to deflecting the water, shoulder 24 serves the added function of preventing the water from flowing directly through the opening or clearance between end section 25 and opening 26. As previously noted, section 25 is loosely fitted within opening 26 and shoulder 24 prevents water from flowing directly through this clearance.

The valve construction of the invention enables high volumes of water to be discharged to the bowl without splashing and with minimum agitation.

As a further advantage, the water passages within the valve have a substantial cross sectional area, thereby minimizing plugging of the passages by foreign materials and eliminating the necessity of a filter or screen in the valve mechanism.

The valve construction can be used in watering bowls in which the valve is operated directly by the animal, or it can also be used in conjunction with a nose plate without alteration or modification of the construction.

Various modes of carrying out the invention are contemplated as being within the scope of the following claims particularly pointing out and distinctly claiming the subject matter which is regarded as the invention.

I claim:

1. A valve construction for a livestock watering apparatus, comprising a bowl having an inlet conduit to be connected to a source of water under pressure, a valve assembly disposed within the conduit to control the flow of water delivered to said bowl, said valve assembly including a body having an inlet connected to said conduit and having a central chamber communicating with said inlet through an inlet passage, said body also having a downwardly facing discharge outlet communicating with said chamber, a valve member to open and close the inlet, a plunger connected to the valve member and extending through said inlet passage and through said chamber and projecting outwardly of said body at a location opposite said inlet and defining an actuating member, the portion of the plunger disposed within said inlet passage being spaced inwardly of said inlet passage to provide a clearance therebetween, the portion of said plunger disposed within said chamber having a laterally extending annular shoulder, depressing of said actuating member acting to open said valve member to discharge water through said clearance into said chamber, said shoulder deflecting the water and reducing the velocity of the water being discharged through the outlet of said bowl.

2. The valve construction of claim 1, and including biasing means for urging the valve member to the closed position.

3. The valve construction of claim 1, wherein said body includes a pair of spaced generally parallel walls disposed normal to the axis of said inlet passage, said walls defining said central chamber.

4. The valve construction of claim 1, wherein said outlet extends radially of said body.

5. The valve construction of claim 3, wherein said shoulder is located substantially midway between said walls when the valve member is in the open position.

6. The valve construction of claim 5, wherein said shoulder is disposed normal to the axis of said plunger.

7. A valve construction for a livestock watering apparatus, comprising a bowl having inlet conduit means to be connected to a source of water under pressure, a valve assembly removably mounted in said inlet conduit means to control the flow of water to said inlet conduit means to said bowl, said valve assembly including a body disposed in the bowl and having a water inlet connected to said conduit means, said body having a pair of spaced parallel walls disposed generally normal to the axis of said inlet and defining a central chamber, said body also having an inlet passage connecting said inlet with said central chamber and said body having a generally downwardly facing discharge outlet communicating with said chamber and disposed radially of said body, a valve member to open and close said inlet, a plunger connected to the valve member and extending axially through said inlet passage and through said central chamber and projecting outwardly of the body at a location opposite said inlet and defining a projecting actuating button, the portion of the plunger disposed within the inlet passage having a non-circular outer surface spaced from the inlet passage to provide a clearance therebetween, a laterally extending generally annular shoulder disposed on the portion of the plunger located within said chamber and disposed above said outlet, said shoulder being located substantially midway between said walls when the valve is open, and biasing means for urging the valve member to a closed position, depressing of said button acting to open said valve member against the force of said biasing means to discharge water through said clearance and into said chamber, said shoulder deflecting the water within the chamber and reducing the velocity thereof whereby the water is discharged through said outlet into said bowl with minimum splashing.

8. The valve construction of claim 1 wherein said conduit includes a threaded opening in said bowl, said body being threaded in said opening.

9. The valve construction of claim 7, wherein said biasing means includes a spring disposed outside of said body and interposed between said conduit means and said valve member.

* * * * *